(No Model.)
N. S. CLARK.
MEDICATED NEST EGG.
No. 591,109. Patented Oct. 5, 1897.
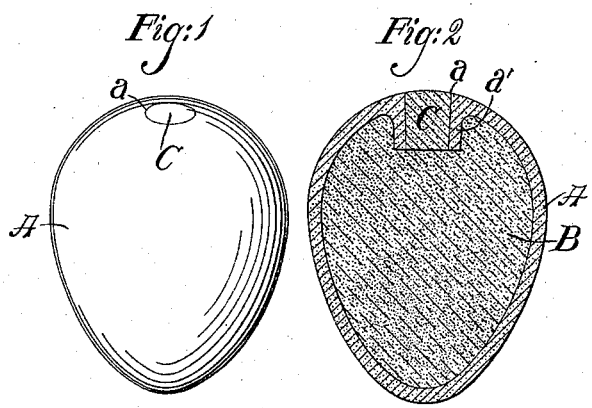
Witnesses:
F. T. Johnson
Alfred D. Townsend
Inventor:
Newman S. Clark
by Hazard Townsend
his atty.

UNITED STATES PATENT OFFICE.

NEWMAN S. CLARK, OF LOS ANGELES, CALIFORNIA, ASSIGNOR, BY MESNE ASSIGNMENTS, TO THE ZUCKER MANUFACTURING COMPANY, OF OAKLAND, CALIFORNIA.

MEDICATED NEST-EGG.

SPECIFICATION forming part of Letters Patent No. 591,109, dated October 5, 1897.

Application filed March 18, 1896. Serial No. 583,782. (No specimens.)

*To all whom it may concern:*

Be it known that I, NEWMAN S. CLARK, a citizen of the United States, residing at Los Angeles, in the county of Los Angeles and State of California, have invented a new and useful Medicated Nest-Egg and Disinfector, of which the following is a specification.

My invention relates to an appliance comprising a porous case and a medicated filling therein.

The primary object of my invention is to provide superior means for freeing setting and laying fowls and their nests, roosts, &c., from lice, mites, and other parasites and inducing and preserving in the fowl a healthy condition; to disinfect nests and prevent infection and to prevent contagious and other diseases among fowls; also, to provide for conveniently and cheaply making the nest-egg as good as new after the same has deteriorated by reason of long use; also, to produce a thin porous shell of great strength which can be cleansed by being burned in the fire without changing its appearance.

Another object of my invention is to provide an artificial nest-egg which will be a perfect imitation of a natural egg, reference being had to the texture and color of the shell.

The accompanying drawings illustrate my invention.

Figure 1 shows the nest-egg ready for use. Fig. 2 is a longitudinal mid-section of the nest-egg.

In the drawings, A indicates the porous shell, and B indicates the medicated filling inside such shell.

The shell is composed of kaolin, flint, feldspar, and asbestos in the proportions substantially as follows, viz: seventy parts powdered koalin, fifteen parts powdered flint, five parts powdered feldspar, and ten parts powdered asbestos fiber. To manufacture the egg-shell, these minerals are mixed with a suitable quantity of water to make a paste, out of which the shell is molded in the ordinary manner of molding hollow ware. The thickness of the walls is preferably about a scant eighth of an inch; but it will be understood that this can be varied without departing from the spirit of my invention, the object being to leave the walls thin enough for the exudation of the chemicals with the desired rapidity, and also at the same time thick enough to afford sufficient strength. The shell when molded is thoroughly baked in a kiln in the ordinary way.

Each shell is manufactured with a filling-opening $a$, preferably in the larger end of the shell, and this filling-opening is provided with an inwardly-projecting collar $a'$, which projects in from the wall of the shell a sufficient distance—say a fourth of an inch, more or less—to form a seat for a stopper C, which is to be used to hold the filling in the shell when the egg is completed. It is desirable to provide as large an area for exudation of the chemicals as possible, and the construction shown gives the required seating for the stopper and at the same time the thin shell, through which the exudation takes place, is made as extensive as possible.

The inwardly-projecting collar gives a sufficient seating for the stopper to be inserted and allows the same to be made of a plastic material which, when set, will resemble in appearance the main body of the egg.

The composition which I prefer for closing the openings is made of lime and plaster-of-paris with water to form a paste. This is easily applied and readily hardens in place and has a porosity through which the exudation can take place. I prefer to use about three parts lime and one of plaster-of-paris, adding coloring-matter, if desired, to give the required tint of shell.

The main body of the shell formed of the composition first above specified, when burned, has the appearance of a natural egg-shell both in texture and in color.

The filling which I have invented for the nest-egg is preferably composed of powdered asbestos and suitable medicaments mixed therewith with a proper proportion of water or other suitable liquid to enable the same to be packed inside the shell in a moist state. The amount of moisture used is preferably just sufficient to cause the matter to ball when squeezed in the hand. The object of using asbestos as an absorbent for the medicaments is to provide for ready and thorough cleansing of the egg when it is desired to recharge the same with the medicaments.

The filling composition which I use is composed of water, carbolic acid, oil of cedar, oil of eucalyptus, and camphor balls, together with a suitable absorbent in the proportions substantially as follows: water, forty-eight fluid ounces; carbolic acid, eight fluid ounces, oil of cedar, one fluid ounce; oil of eucalyptus, one-half fluid ounce, and the ordinary camphor-balls of commerce, eight ounces avoirdupois. To this is added a sufficient quantity of powdered asbestos fiber to form a mixture which will readily ball when squeezed in the hand.

In practice the porous shell is filled with this filling composition, which is rammed tightly in place until the shell is completely filled. Then the filling-opening is closed with a suitable stopper, preferably the plastic composition of lime and plaster-of-paris above set forth, which is allowed to set, and the egg is then ready for use.

In practical use the egg is placed in the nest in the way customary with ordinary nest-eggs and there it performs its work.

The rapidity or amount of exudation will vary, depending upon the use to which the egg is put. If placed in the nest of a setting fowl and thus constantly subjected to animal heat and to the oil and other deposits from the feathers of the fowl, the exudation of the chemicals will be more rapid on account of the heating and the pores of the egg will be more liable to become closed by the impurities, so that an egg thus used should be renewed and recharged more frequently than one which is used in the nests of laying fowls.

The attendant can determine by the appearance and odor of the egg whether it requires to be renewed. Renewal will be found desirable at the end of every four to six months where the egg has been constantly used under setting fowls successively.

To renew the egg, it is placed in the fire and brought to a high heat, which will effectually remove all the oil and animal and other impurities from the pores of the shell and also from the filling, if the impurities have penetrated through the shell. When the egg is thus purified, the stopper may be bored out or otherwise removed and the egg can be placed to soak in a bath of the medicaments.

The asbestos filling remains unchanged by the heat and absorbs the medicaments, and when fully charged another stopper is placed in the filling-opening and the egg is practically as good as new.

The composite egg-shell above set forth is capable of withstanding the heat necessary to thus purify it and is strong and durable, so that the egg is for all practical purposes indestructible.

Now having described my invention, what I claim as new, and desire to secure by Letters Patent, is—

1. A nest-egg the shell of which is composed of kaolin, flint, feldspar, and asbestos in the proportions substantially as specified.

2. The filling for a nest-egg composed of powdered asbestos and suitable medicaments substantially as set forth.

NEWMAN S. CLARK.

Witnesses:
JAMES R. TOWNSEND,
F. M. TOWNSEND.